United States Patent [19]

Carrell et al.

[11] E Patent Number: Re. 33,146

[45] Reissued Date of Patent: Jan. 16, 1990

[54] OCCUPANCY RESPONSIVE TEMPERATURE CONTROL SYSTEM

[75] Inventors: Edwin A. Carrell, Georgetown; David H. Spivey, Austin, both of Tex.

[73] Assignee: Flair International Corporation, Hauppauge, N.Y.

[21] Appl. No.: 937,018

[22] Filed: Dec. 2, 1986

Related U.S. Patent Documents

Reissue of:

[64] Patent No.: 4,485,864
Issued: Dec. 4, 1984
Appl. No.: 225,101
Filed: Jan. 14, 1981

[51] Int. Cl.[4] ..... G05D 23/00; H01H 3/16

[52] U.S. Cl. ..... 165/11.1; 165/12; 236/47

[58] Field of Search ..... 236/47, 94, 46 R; 165/11 R, 12

[56] References Cited

U.S. PATENT DOCUMENTS

| | | | |
|---|---|---|---|
| 1,597,773 | 1/1927 | Dodge | 236/47 |
| 2,655,806 | 10/1953 | Stiler | 70/57 |
| 3,188,618 | 6/1965 | Rentz | 340/227 |
| 3,352,490 | 11/1967 | Dalzell | 236/68 |
| 3,529,214 | 9/1970 | Corn | 317/124 |
| 3,934,797 | 1/1976 | Perlmutter | 236/46 |
| 3,984,699 | 10/1976 | Bailey | 307/41 |
| 4,223,831 | 9/1980 | Szarba | 236/47 |
| 4,284,126 | 8/1981 | Dawson | 165/11.1 |
| 4,315,596 | 2/1982 | Johnson, Jr. et al. | 165/11.1 |
| 4,318,508 | 3/1982 | Glasgow et al. | 236/47 |

*Primary Examiner*—William E. Wayner
*Attorney, Agent, or Firm*—Roylance, Abrams, Berdo & Goodman

[57] ABSTRACT

A room temperature control system includes a transmitter-receiver unit for producing an acoustic standing wave pattern in a room and for producing a signal when that pattern is disturbed by motion in the room. A logic circuit provides timing signals and interprets a pattern disturbance signal to determine whether it evidences room occupancy. The timing and interpreting sequence is initiated by a switch which detects opening and closing of the room door. Temperature control by the room thermostat is permitted when the room is occupied and control within a wider range can be provided when it is not occupied.

14 Claims, 4 Drawing Sheets

OCCUPANCY RESPONSIVE TEMPERATURE CONTROL SYSTEM

Matter enclosed in heavy brackets [ ] appears in the original patent but forms no part of this reissue specification; matter printed in italics indicates the additions made by reissue.

This invention relates to a method and apparatus for controlling temperature in a confined space and more specifically to a method and apparatus for controlling a heating or cooling system on the basis of need for the purpose of conserving energy.

BACKGROUND OF THE INVENTION

Temporary living facilities such as hotels and motels and, in some cases, apartments are commonly provided with heating and air conditioning systems for the comfort of their guests and those systems have traditionally been operated on an "overuse" basis, i.e., they were "on" most of the time on the assumption that it is better to leave them on than to have the guests uncomfortable, and cheaper than to have employees turning them off and on when guests leave or arrive. They are commonly thermostatically controlled so that room temperatures are between desired limits, but no special effort was made to deactivate the supply of heat or a cooling medium to an unoccupied room.

More recently, with the increased awareness of fuel shortage and the increased cost of energy, efforts have been made to induce patrons of such establishments to voluntarily turn off air conditioning units or heating systems whenever they left their rooms unoccupied. While this has had some beneficial impact, guests tend to ignore requests of this type for various reasons.

Other efforts have therefore been made to render the deactivation of the heating or cooling systems less voluntary, and to make use of those systems more efficient. One example of such systems is found in U.S. Pat. No. 4,060,123, Hoffman et al., in which a thermostatically controlled system is operative to control the room temperature within the normal comfort range only when the guest inserts his room key, or some other unique, recognizable identifier unto a lock switch or the like. The theory behind this patent seems to be that the system need only operate when the room is occupied and that the room will be occupied when, and only when, the key is available for insertion into the lock switch.

While the goal of operating the system only when the room is occupied is a laudable one, it will be apparent that the Hoffman et al., system can be easily defeated whenever more than one key (or other identifier) is distributed. It is also undesirable because it required an extra activity on the part of the guest.

Another system is shown by Curatolo in U.S. Pat. No. 4,091,866 in which the H/AC system is controlled on the basis of opening and closing the door giving access to the room. This is, of course, only usable under special conditions and presents the problem of having to have the door lock in a special condition.

In either of these systems, room occupancy is not determined directly but, rather, inferred from the state of devices in or associated with the room. Other systems directed generally to energy conservation in the control of H/AC systems are shown in the following U.S. Pat. Nos.:

1,597,773—Dodge 2,655,806—Stiler
3,188,618—Rentz
3,352,490—Dalzell et al.
3,529,214—Corn
3,934,797—Perlmutter
3,984,699—Bailey.

BRIEF DESCRIPTION OF THE INVENTION

An object of the present invention is to provide an energy-efficient system for controlling room temperature based on direct detection of space occupancy, the system being deactivated when the space is not occupied.

A further object is to provide a system which is responsive to opening and closing of a room access door to activate a means for directly determining the state of room occupancy, and for then deactivating the room temperature modifying system if the room is found to be unoccupied.

Briefly described, the invention includes a method of operating a system for modifying the temperature of an enclosed space which has at least one access portal, the system being of the type having means for changing the temperature of the air in the space and means responsive to the temperature within the space for producing a command signed to cause heat to be supplied to or withdrawn from the space, the method comprising the steps of detecting the opening and closing of the access portal; producing within the space a standing wave pattern of energy in response to opening and closing of the portal; detecting perturbations of the standing wave pattern indicative of a moving body within the space; and deactivating the means for producing a command signal when no such perturbations are detected by the end of a predetermined interval of time following opening and closing of the portal.

In another aspect, the invention includes an apparatus for controlling the operation of a heating or cooling system as a function of occupancy of a space having an access portal, the system being of the type having a temperature modifying device and a temperature sensing means for sensing the air temperature in the space and providing a command signal to operate the temperature modifying device when the sensed temperature is outside of a desired range, the apparatus comprising transmitter means for selectively transmitting acoustic energy into said space to establish a standing wave pattern therein; receiver means responsive to energy received from within said space to produce a signal of a first type when said standing wave pattern is undisturbed and a signal of a second type when said standing wave pattern is disturbed by motion of a body occupying the space; and logic circuit means connected to said receiver means and to said temperature sensing means for inhibiting the production of the command signal to deactivate said temperature sensing means in response to the production of a signal of said first type so that said temperature modifying device is permitted to operate when said wave pattern is disturbed.

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE DRAWINGS

Figure 1:
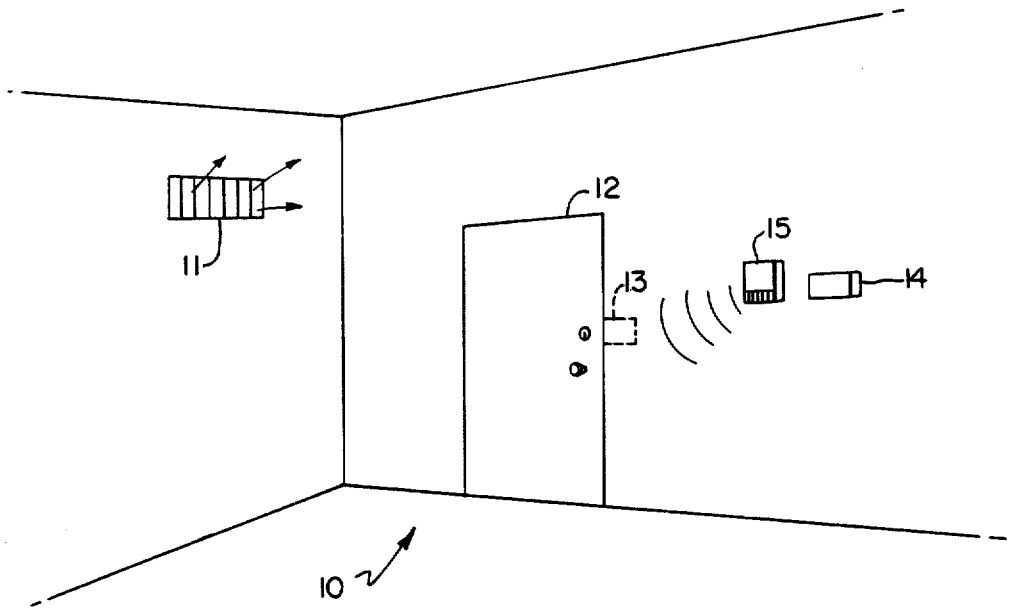
FIG. 1 is a partial schematic illustration of a controlled space, such as a hotel room, equipped with apparatus in accordance with the invention.

As illustrated in FIG. 1, a room 10 having a system in accordance with the present invention includes a heating or air conditioning system having some means for providing a heating or cooling medium to the room, this means being illustrated as an air inlet vent 11 which can supply heated or cooled air, in a conventional fashion, depending upon the seasonal requirements. A door 12 providing access to the room is equipped with a switch 13, which is advantageously mounted in a frame of the door and responds to opening and closing of the door. A thermostat 14 is also provided at some location in the room, as is conventional, for sensing the temperature in the room and controlling the quantity of heating or cooling medium, such as the air supplied through vent 11.

Also in accordance with the invention, the room is provided with an ultrasonic transmitting and receiving device 15 which is capable of transmitting acoustic energy into the space to establish a standing wave pattern therein, and a receiver responsive to energy received from within the space to produce an electrical control signal when the standing wave pattern is perturbed by motion of a person within the space. The thermostat 14 and the acoustic transmitter and receiver 15 can advantageously be combined into a single unit, but this is by no means critical to the proper operation of the system, and it is frequently desirable to have the units completely separate and independent of each other, particularly when the presence detector aspect of the system is being added to a room which already is supplied with the conventional heating, cooling and thermostat equipment.

Figure 2:
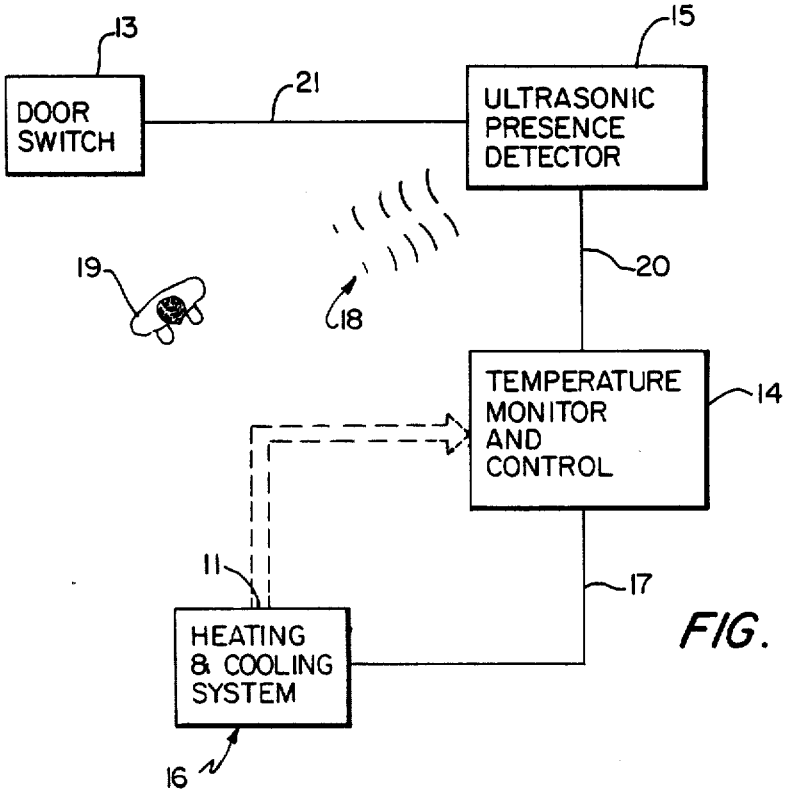
FIG. 2 is a simplified schematic block diagram of the components of a system in accordance with the present invention.

The units illustrated in FIG. 1 are shown in a more functional form in the simplified block diagram of FIG. 2 which shows a heating and cooling system indicated generally at 16 which provides the heat for the room through means such as vent 11. The thermostat 14 provides, in a conventional fashion, one or more control signals on a line 17 to cause the system 16 to cycle on and off to maintain the room temperature within a desired comfort range. The presence detector 15 transmits and receives acoustic energy, illustrated at 18 and determines the presence of a person 19 moving within the room. If there is no movement within the room, the acoustic energy transmitted by the presence detector simply creates a standing wave pattern within the room, and the control function is such that its output 20 prevents the thermostat 14 from activating the heating and cooling system. Thus, the temperature of the room is not controlled. It will be noted, however, that a secondary control range can, and normally would be, provided so that, while the thermostat would not be allowed to control the temperature within a normal comfort range, the system could operate to prevent the room from reaching an extreme temperature in either direction.

The presence detector operates in response to actuation of the door switch 13 which can be any form of switch capable of producing an output signal 21 when the position of the portal is changed. For example, switch 13 can be a normally open switch which is maintained in a closed circuit condition when the door is closed. Thus, when the door is opened and reclosed, the switch would be momentarily opened and then reclosed, providing a signal on line 21 causing the presence detector to operate. The presence detector can be time-controlled to operate only for a short interval following receipt of a switch signal, examining the room for occupancy, and then deactivating itself since it may not be necessary to continuously check the room for occupancy. However, the simplest operation is to allow the detector to operate continuously since it consumes very little power and since, in some room layouts, the standing wave pattern may not reach all parts of the controlled area such as, for example, a bathroom located adjacent the main entrance door.

Detector 15 can also be provided with an adjustable delay setting to deactivate the system in the event that the room door is allowed to stay open for a long interval of time. This delay can be adjusted to an interval between, for example, 2 and 10 minutes. Thus, if the door were to be left open for an interval longer than 10 minutes, the system would provide a signal 20 which would deactivate the heating and air conditioning system. However, the system would be reactivated as soon as the door is closed.

The motion delay time interval, which can be adjusted for between 1 and 15 seconds, for example, establishes the time after the door switch operates and before motion sensed by the ultrasonic energy transmitted into the room is interpreted as evidencing room occupancy. This prevents the motion detector from responding to motion of, for example, the door itself and falsely identifying that motion as the presence of a person in the room.

Figure 3:
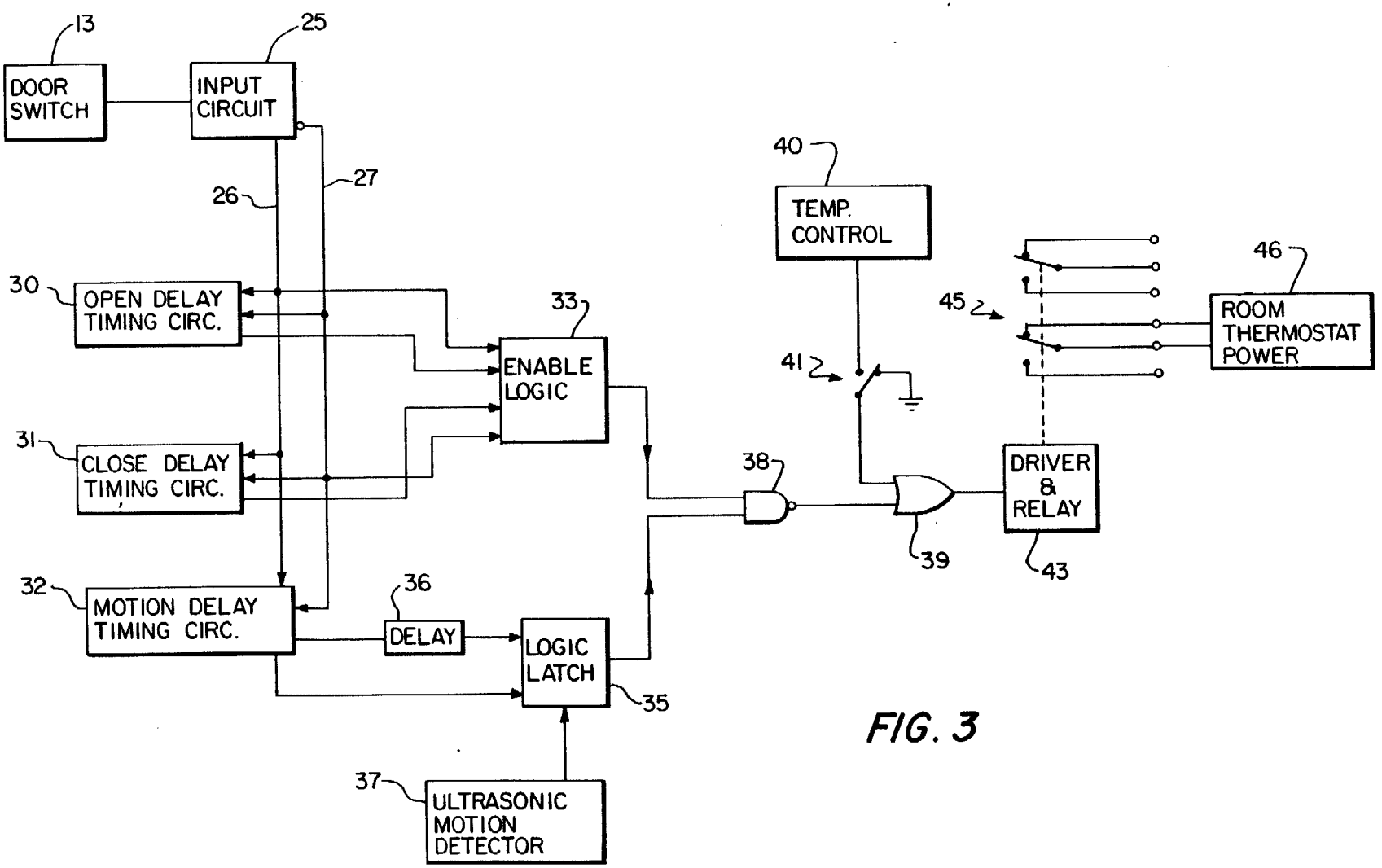
FIG. 3 is a more detailed block diagram of the system of FIG. 2.

A more complete block diagram of the control portion of the system is shown in FIG. 3 wherein the door switch 13 is shown connected to an input circuit 25 which produces two output signals, one being the inverse of the other, on lines 26 and 27. These signals are supplied to timing circuits 30, 31 and 32 and to an enable logic circuit 33. Timing circuits 30 and 31 produce logic output signals as inputs to logic circuit 33, and timing circuit 32 produces two output signals which are connected to a logic latch circuit 35, one of those signals being delayed by a delay circuit 36.

An ultrasonic motion detector unit 37 provides [and] an output to latch circuit 35, this signal being a logic low if there is no detected motion in the space and a logic high is motion therein disturbs the wave pattern. Unit 37 is a standard unit designed for use with security systems and is available as the Sentinal Ultrasonic Detector, Mode 10472, manufactured by Delta Products, Inc. of Grand Junction, Colo.

The unit transmits an ultrasonic pattern at about 40 kHz., and the horizontal pattern is a lobe covering an arc of about 60°. The logic high and low signals produced by this and other portions of the system to be described refer to signals nominally above 8 v. and below 1 v., respectively, for the embodiment disclosed.

The outputs of enable logic circuit 33 and latch 35 are connected as inputs to an inverting OR gate circuit 38, the output of which is one input to a NOR gate circuit 39. The other input to NOR gate 39 is from a temperature control circuit 40 through a selectable jumper or switch 41. Switch 41 is in the position shown when temperature control 40 is not to be used, as will be described. The output of gate 39 is connected to a driver and relay circuit 43 which controls the position of a plurality of contact sets 45, two of which are shown in FIG. 3. At least one of those contact sets is connected to the room thermostat power 46 to either enable or disable the room thermostat and, with it, the H/AC system.

The system responds to two external stimuli, motion in the observed space and opening or closing of the door switch, and is capable of also responding to temperature in the area of the device if that function is desired. The general manner in which this is done will be described with reference to FIG. 3, and operation of individual circuits can then be understood from FIGS. 4 and 4a.

Open delay timing circuit 30 responds to a signal on line 27 when the door switch is opened to initiate a timing cycle which is adjustable by adjusting time constants therein but which would normally be between about two and about ten minutes. The purpose of this timing cycle is to deactivate or disable the H/AC system if the door to the room is left open, even if motion in the room is detected, to avoid wasteful loss of energy through the open door to the outside or a corridor. If the door is closed before the timing cycle expires, a signal on line 26 resets the timer immediately.

Close delay timing circuit 31 also has a delay cycle of from about two to about 10 minutes and is initiated by closing the door which provides a signal on line 26. If no motion is detected during this timing cycle, the H/AC system will be disabled, except for response to extreme conditions, to be described.

Motion delay timing circuit 32 responds to a door closing signal on line 26 to initiate a timing cycle of from about five to about 15 seconds after which detection of motion in the room can enable operation of the H/AC system. The purpose of this delay, as previously mentioned, is to give everything in an unoccupied room a chance to "settle down" (e.g., moving doors, blowing drapes, etc.) before detected motion is interpreted as indicating room occupancy.

The logic latch circuit 35 responds to a door closing signal from line 26, briefly delayed by circuit 36 to allow initiation of the timing cycle circuit 32 to provide an enabling output to the H/AC system, and subsequently responds to signals provided by the output of circuit 32 and by a motion input from detector 37 to keep the H/AC system enabled. If the door has been closed, the cycle of timer 32 has ended and motion is detected, latch 35 is set and will remains set, "remembering" that the room is occupied, until the door is again opened. Setting of latch 35 permits the H/AC system to operate under control of the room thermostat.

Temperature control circuit 40 is for the purpose of preventing the monitored space from reaching an extreme temperature. It includes a temperature sensing element, such as a thermistor, and logic elements to provide an "enable" signal through gate 39 if an extreme temperature is reached to activate the H/AC system. Normally, the room might be controlled by the thermostat at, e.g., 72° F. Circuit 40 can be set to provide an enabling signal at, for example 60° F. in winter or 85° F. in summer. Thus, even if the room is unoccupied for long intervals, the system will not allow the temperature to become excessively cold (or warm), so long as circuit 40 is used by closing the switch 41. Opening switch 41 will eliminate this wide-band control is that feature is not desired.

Figure 4:
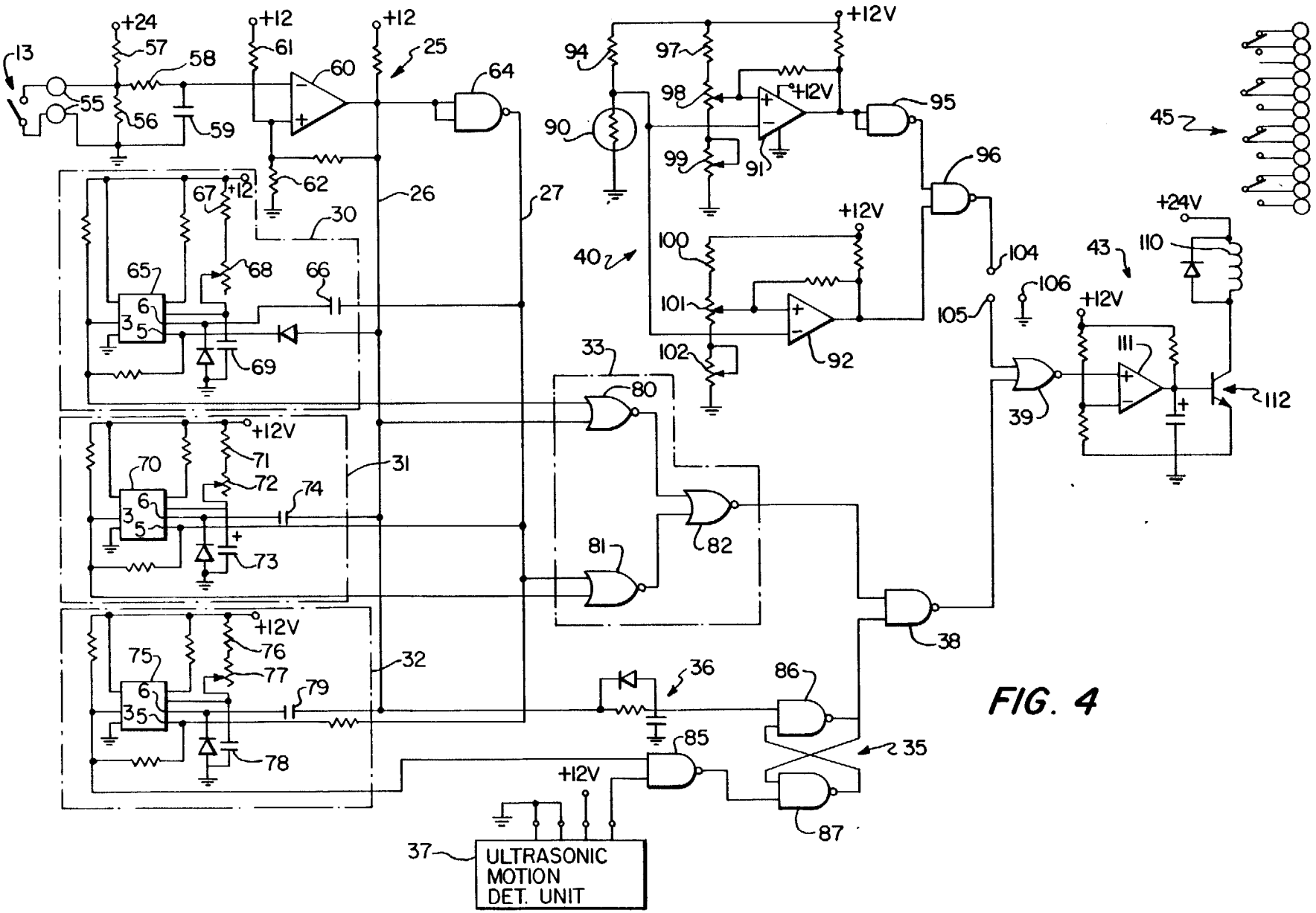
FIGS. 4 and 4a are schematic circuit diagrams of a system in accordance with the present invention.
Figure 4A:
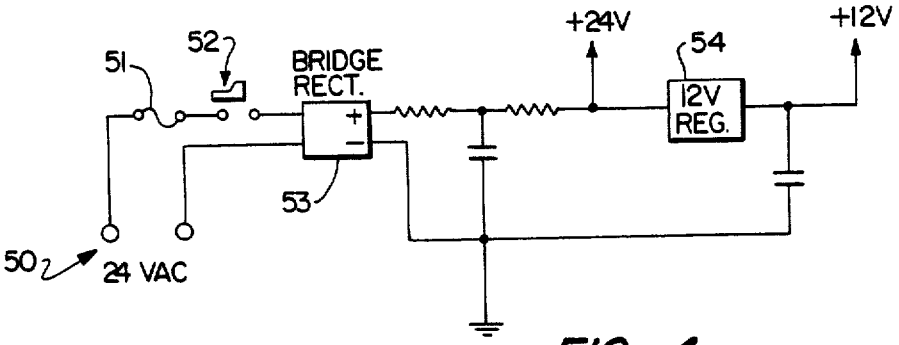

Turning now to FIGS. 4 and 4a, further details of an apparatus in accordance with FIGS. 1–3 will be described. FIG. 4a shows a power supply for the system which provides the D.C. voltages necessary to operate the various solid state circuits therein. 24 v. A.C. is supplied to terminals 50 and connected through a fuse 51 and power switch 52 to a conventional bridge rectifier circuit 53, the output of which is filtered by series resistors and shunt capacitors in a well known manner. The resistors are selected so that, at the output of the filter, a 24 v. D.C. source is available, and is connected to input circuit 25 and relay and driver circuit 43. This 24 v. is also supplied to a conventional 12 v. regulating circuit to provide 12 v. D.C. at the output thereof for connection to various other points in the system.

Turning now to FIG. 4, it will be seen that the input circuit includes terminals 55 which are connected to conductors from door switch 13, the switch being a normally open switch which is closed when the door is closed, short-circuiting the terminals together. The terminals are connected across a resistor 56 which is the lower portion of a voltage divider, also including a resistor 57, between the 24 v. supply and ground. The junction between these two resistors is connected through a series resistor 58 to a capacitor 59 between that junction and ground, and to the negative input of a differential amplifier 60. The positive, or non-inverting input of that amplifier is connected to a separate divider including resistors 61 and 62 which provides a reference for the amplifier. The output of the amplifier is connected to line 26 and to the input of a NAND gate inverter 64, the output of which is line 27. Differential amplifier 60 operates as a comparator which provides a logic high output when switch 13 is closed, and under those conditions the output of gate 64 is a logic low.

The input circuit including resistors 56–58 and capacitor 59 has two significant features, one of which is that the input resistance of the door switch and the associated wiring can be as great as about 400 ohms without adversely affecting operation. Thus, lengthy runs or wiring and degradation of switch contact resistance will not affect circuit operation unless those characteristics become extremely severe.

Secondly, the time constant associated with these components, about 0.1 seconds, prevents any circuit reaction to switch contact bounce or intermittent operation which could be caused by shock or vibration. It also greatly reduces the susceptibility of the circuit to electrical interference coupled via the door switch wiring.

Timing circuit 30 includes a solid-state monolithic timer/controller 65 which is capable of producing very long delays from fractions of seconds to days. The circuit is a solid state component available under the designation XR-2242 and includes an internal time-base oscillator, an eight-bit binary counter and a control flip-flop. The input signal for circuit 55 is provided through a capacitor [56] *66* to pin 6 of circuit 65. The duration of the timing cycle is determined by the time constant of resistors 67 and 68 and capacitor 69. In its normal state, output pin 3 of circuit 65 is high. When the circuit is triggered by an input to pin 6, pin 3 goes low, and returns to a high state at the end of the timing cycle. Thus, when the door opens the signal through capacitor [26] *66* begins that timing cycle.

Timing circuit 31 is substantially identical in overall configuration and also includes a timer/controller 70, which is identical to circuit 65, the time constant of that circuit being determined by resistors 71 and 72 and capacitor 73. The input is supplied from line 26 through capacitor 74.

Timing circuit 32 is similar in its overall arrangement and includes a timer/controller 75, resistor 76 and 77 and a capacitor 78 controlling the time constant thereof, the input being supplied through a capacitor 79. It will be observed that pin 5 in each of circuits 65, 70 and 75 is a reset input location. As will be recognized from FIG. 4, resistors 68, 72 and 77 are adjustable in value to establish the time constant for each circuit between the limits previously described.

Latch circuit 33 includes NOR gates 80, 81 and 82, the output of circuit 30 and the signal on line 26 being the inputs to gate 80; the signal on line 27 and the output of circuit 31 being the inputs to gate 81; and the outputs of gate 80 and 81 and being the input to gate 82.

If the door is open, the output of comparator 60 is low, driving the lower input to gate 30 low. While circuit 30 is timing, its output and the top input to gate 30 are low. Thus, the output of gate 80 and the upper input to gate 82 will be high, the output of gate 82 and the upper input to gate 38 will be low, and the output of gate 38 will be high to enable the FIG. 4 circuit output. With the door closed and/or circuit 30 not timing, the output of gate 80 is low.

If the door is closed, the output of gate 64 is low which means that the upper input to gate 81 is low. While circuit 31 is timing, its output and the lower input to gate 81 are low. Thus, output of gate 81 and lower input to gate 82 are high, the output of gate 82 and the upper input to gate 38 will be low, and the output of gate 38 will be high to again enable the circuit output. When the door is open and/or circuit 31 is not timing, the output of gate 81 is low.

The latching circuit 35 includes NAND gates 85, 86 and 87, connected in a latching arrangement. The latch output is the output of gate 86 which is normally high until motion is detected and low thereafter until the latch is reset. Before an input from motion detector unit 37 can cause the latch to be set, the door must be closed and the cycle of timing circuit 32 must be ended. When those conditions are present, a high motion input signal to gate 85 causes the output of that gate to go low and, therefore, the latch output to go low. Reset is accomplished when the door is opened. When the latch output is low, the output of gate 38 will be low, enabling the circuit output. The temperature control circuit 40 includes a thermistor 90 and two differential amplifier circuits 91 and 92 which respond to changes in the resistance of thermistor 90. The thermistor is connected in series with a fixed resistor 94, the junction between those elements being connected to the inverting input terminals of amplifiers 91 and 92. The output of amplifier 91 is inverted by a gate 95, the output of that gate and of amplifier 92 being connected to the inputs of a NAND gate 96. Differential amplifier 91 has an adjustable divider circuit including resistors 97, 98 and 99, and circuit 92 has a similar divider including resistor 100, 101 and 102 which are adjustable to establish the control point temperatures, high and low, respectively.

The output of gate 96 is connected to a terminal 104 and the upper input to gate 39 is connected to a terminal 105, these terminals being chosen and disposed so that they can be interconnected by a jumper if circuit 40 is to be operatively included in the system. If circuit 40 is not to be included, a jumper is placed between terminal 105 and a ground terminal 106.

The output circuit 43 includes and energizing winding 110 of a relay having control over contact sets 45. The output of gate 39 is provided to a driver circuit including an amplifier 111 and a power transistor indicated generally at 112 with suitable biasing resistors, the components being chosen to drive the relay selected, as necessary.

The following table shows typical values for various circuit components described, the remaining components being biasing resistors and the like which are connected in accordance with standard arrangements for the circuits chosen which will be familiar to those skilled in the art.

TABLE OF VALUES

| Resistors (ohms) | | Capacitors (μF) | |
|---|---|---|---|
| 56 | 2.2K | 59 | 10 |
| 57 | 4.7K | 66 | 0.1 |
| 58 | 10K | 69 | 10 |
| 67 | 47K | 73 | 10 |
| 68 | 0.5M | 74 | 0.1 |
| 71 | 47K | 78 | 0.22 |
| 72 | 0.5M | 79 | 0.1 |
| 76 | 33K | | |
| 77 | .5M | | |
| 90 | 300 @ 25° C. | | |
| 94 | 4.7K | | |
| 97 | 4.7K | | |
| 98 | 100 | | |
| 99 | 500 | | |
| 100 | 4.7K | | |
| 101 | 100 | | |
| 102 | 500 | | |

Figure 5:
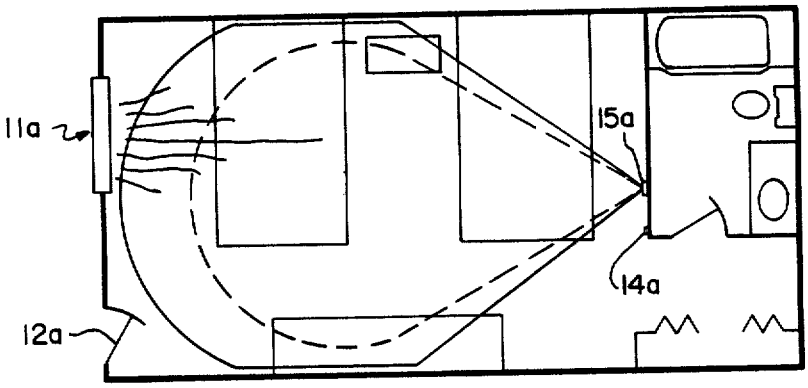
FIGS. 5 and 6 are plan views of typical room layouts showing arrangements for installation of apparatus according to the present invention.
Figure 6:
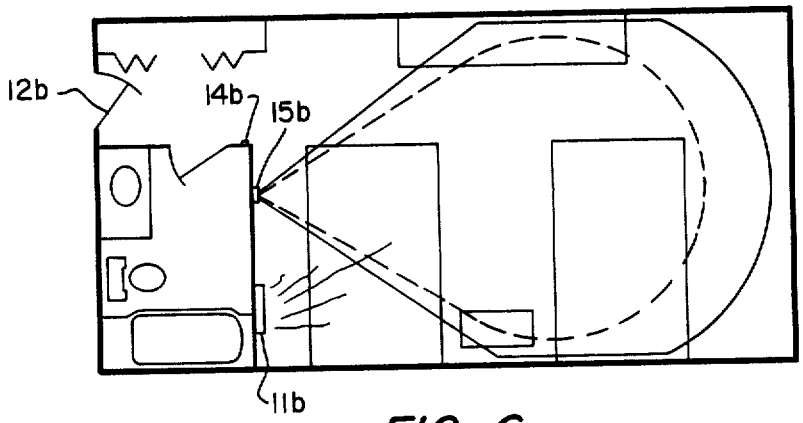

FIGS. 5 and 6 show typical hotel and motel room layouts and the manner in which the components of the system can be typically installed. In each case, numerals analogous to those used in connection with FIG. 1 are again employed, the subscript "a" being applied to FIG. 5 and subscript "b" to FIG. 6. It will be observed that the cone-shaped dashed line indicates the area which is typically that of maximum sensitivity of the ultrasonic motion detector, the region between the dashed line and the solid line being the region of reduced sensitivity. A typical effective distance from the transducer 15a, 15b to the end of the region of maximum sensitivity is about 30 feet for the unit identified previously.

While certain advantageous embodiments have been chosen to illustrate the invention it will be understood by those skilled in the art that various changes and modifications can be made therein without departing from the scope of the invention as defined in the appended claims.

What is claimed is:

1. A method of operating a system for modifying the temperature of an enclosed space which has at least one access portal, the system being of the type having means for changing the temperature of the air in the space and means responsive to the temperature within the space for producing a command signal to cause heat to be supplied to or withdrawn from the space when the temperature therein departs from a control range, the method comprising the steps of detecting the opening and closing of the access portal;

producing within the space a standing wave pattern of energy in response to the opening or closing of the access portal;

detecting perturbations of the standing wave pattern indicative of a moving body within the space; and deactivating the means for producing [a] *the* command signal when no such perturbations are detected by the end of a predetermined interval of time following opening and closing of the portal.

2. A method according to claim 1 wherein the energy is acoustic energy.

3. A method according to claim 2 wherein the acoustic energy is produced by a transducer operating at an ultrasonic frequency.

4. A method according to claim 2 and further steps of establishing a second control range wider than the first mentioned control range;

providing a temperature sensitive device for sensing room temperature; and producing a command signal when the sensed temperature in the room departs from the second control range without regard for the detection of perturbations of the standing wave pattern.

5. A method according to claim 1 wherein the standing wave pattern is produced by:

transmitting ultrasonic energy into said space at a predetermined constant amplitude and frequency.

*6. A method of operating a system for modifying the temperature of an enclosed space having at least one access portal, the system including temperature means for changing the temperature of the air in the space and regulating means responsive to the temperature within the space for producing a command signal to said temperature means causing heat to be supplied to or withdrawn from the space when the temperature therein departs from a first control range, the method comprising the steps of:* detecting absence or presence of a body within the space;

detecting the opening or closing of the access portal;

initiating a predetermined interval of time in response to the opening or closing of the access portal;

deactivating the regulating means when no presence of a body is detected during said predetermined interval of time; and maintaining active the regulating means, once the presence of a body is detected during said predetermined interval of time, even when no body presence detected outside said predetermined interval.

*7. A method according to claim 6 wherein the motion of the body is detected.*

*8. A method according to claim 7 wherein the motion of the body is detected by producing a standing wave pattern of energy within the space and detecting perturbations of the standing wave pattern indicative of the body motion within the space.*

*9. A method according to claim 8 wherein the energy is acoustic produced by a transducer operating at an ultrasonic frequency.*

*10. A method according to claim 8 wherein the standing wave pattern is produced by* transmitting ultrasonic energy into said space at a predetermined constant amplitude and frequency.

*11. A method according to claim 8 wherein the standing wave pattern of energy is produced continuously.*

*12. A method according to claim 6 and further steps of* establishing a second control range wider than the first control range;

providing a temperature sensitive device for sensing room temperature; and producing a command signal when the sensed temperature in the room departs from the second control range without regard for the detection of the presence of the body.

*13. A method according to claim 6 wherein the regulating means is deactivated when the access portal is detected in an open position for a preset time interval.*

*14. A method according to claim 6 wherein detecting the absence or presence of a body is performed continuously.*

* * * * *